(12) United States Patent
Belotti et al.

(10) Patent No.: US 9,969,411 B2
(45) Date of Patent: May 15, 2018

(54) HAND TRUCK

(71) Applicants: John C. Belotti, Bay City, MI (US); Stuart J. Shellenbarger, Hale, MI (US); Chad D. Winters, Bay City, MI (US); Christopher J. Guoan, Alger, MI (US)

(72) Inventors: John C. Belotti, Bay City, MI (US); Stuart J. Shellenbarger, Hale, MI (US); Chad D. Winters, Bay City, MI (US); Christopher J. Guoan, Alger, MI (US)

(73) Assignee: Magline, Inc., Standish, MI (US)

( * ) Notice: Subject to any disclaimer, the term of this patent is extended or adjusted under 35 U.S.C. 154(b) by 0 days. days.

(21) Appl. No.: 14/745,563

(22) Filed: Jun. 22, 2015

(65) Prior Publication Data

US 2016/0368515 A1 Dec. 22, 2016

(51) Int. Cl.
*B62B 1/00* (2006.01)
*B62B 1/12* (2006.01)
*B62B 5/06* (2006.01)

(52) U.S. Cl.
CPC .............. *B62B 1/002* (2013.01); *B62B 1/12* (2013.01); *B62B 5/06* (2013.01)

(58) Field of Classification Search
CPC .. B62B 1/00; B62B 1/002; B62B 1/12; B62B 1/04; B62B 1/08; B62B 1/008; B62B 1/10; B62B 3/00; B62B 3/02; B62B 3/022
See application file for complete search history.

(56) References Cited

U.S. PATENT DOCUMENTS

| | | | | | |
|---|---|---|---|---|---|
| 2,546,876 | A | * | 3/1951 | Sutherland | B62B 1/14 280/47.27 |
| 3,035,727 | A | * | 5/1962 | Turner | B62B 1/14 280/47.27 |
| 3,540,753 | A | * | 11/1970 | Hanson | B62B 3/108 254/3 R |
| 3,666,285 | A | * | 5/1972 | Fertig | B62B 1/12 188/22 |
| 3,746,360 | A | * | 7/1973 | Crawford | B62B 1/12 280/47.12 |
| 3,873,118 | A | * | 3/1975 | Takagi | B62B 1/002 280/47.2 |
| 4,009,891 | A | * | 3/1977 | Jensen | B62B 1/002 280/47.2 |
| 4,239,249 | A | * | 12/1980 | Sprague | B62B 1/002 280/47.2 |

(Continued)

*Primary Examiner* — James M Dolak
(74) *Attorney, Agent, or Firm* — Varnum, Riddering, Schmidt & Howlett LLP

(57) ABSTRACT

A hand truck includes a frame, a toe plate connected to the frame, a pair of wheels rotatably secured to the frame, and a handle connected to the frame. A fourth-wheel attachment is pivotally connected to the frame at a first point and removable connected to the frame at a second point. A lever positioned adjacent to the handle causes the removable connection between the fourth-wheel attachment and the frame to be released, allowing the fourth-wheel assembly to pivot away from the frame. An embodiment of a hand truck includes a break back bar. The break back bar is pivotable with respect to the frame. The break back bar may be deployed and stood on by a user to prevent movement of the hand truck while pivoting a load.

9 Claims, 18 Drawing Sheets

(56) References Cited

U.S. PATENT DOCUMENTS

| | | | | |
|---|---|---|---|---|
| 5,160,153 A * | 11/1992 | Zan | B62B 5/02 | 280/43.1 |
| 5,277,439 A * | 1/1994 | Pipes | B62B 1/20 | 280/47.2 |
| 5,445,399 A * | 8/1995 | Salvucci, Sr. | B62B 1/002 | 280/47.2 |
| 6,237,925 B1 * | 5/2001 | Koenig | B62B 1/12 | 280/47.28 |
| 6,341,788 B1 * | 1/2002 | Ciccone | B25H 1/00 | 280/47.28 |
| 7,387,306 B2 * | 6/2008 | Zimmer | B62B 1/125 | 280/40 |
| 7,530,579 B2 * | 5/2009 | Butler | B62B 1/145 | 280/124.12 |
| 8,100,430 B2 * | 1/2012 | Meyers | B62B 1/002 | 280/30 |
| 8,136,822 B2 * | 3/2012 | Harrison | B62B 1/14 | 280/47.17 |
| 8,235,401 B1 * | 8/2012 | Scriven | B62B 1/12 | 280/47.17 |
| 8,413,999 B2 * | 4/2013 | Nassaux | B62B 3/02 | 280/47.16 |
| 8,465,046 B2 * | 6/2013 | Meyers | B62B 1/002 | 280/30 |
| 8,651,500 B2 * | 2/2014 | Mitchell | B62B 3/0606 | 280/47.18 |
| 8,939,453 B1 * | 1/2015 | Ficociello | B62B 1/147 | 280/47.18 |
| 9,096,251 B2 * | 8/2015 | Bowden | B62B 1/12 | |
| 9,150,233 B2 * | 10/2015 | Su | B62B 3/022 | |
| 9,302,688 B2 * | 4/2016 | Reddi | B62B 1/002 | |
| 9,321,471 B1 * | 4/2016 | Gedeon-Janvier | B62B 1/002 | |
| 9,616,907 B1 * | 4/2017 | Gibson | B62B 1/12 | |
| 9,643,631 B2 * | 5/2017 | Berlinger | B62B 1/002 | |
| 9,688,298 B1 * | 6/2017 | Su | B62B 1/002 | |
| 9,707,985 B2 * | 7/2017 | Lawrence | B62B 1/12 | |
| 9,776,650 B1 * | 10/2017 | Berlinger | B62B 1/12 | |
| 9,810,571 B1 * | 11/2017 | Su | G01G 19/083 | |
| 2011/0285113 A1 * | 11/2011 | Su | B62B 1/12 | 280/654 |
| 2012/0242063 A1 * | 9/2012 | Bruckner | B62B 1/002 | 280/651 |

* cited by examiner

HAND TRUCK

FIELD OF INVENTION

The present invention relates to a hand truck and, more specifically, to a hand truck with new integrated safety and improved use features.

BACKGROUND

Many devices have been developed over the years to aid people in the movement and transportation of items that otherwise would be too heavy or unwieldy to move. There exists a multitude of powered devices such as cranes, forklifts, hydraulic ramps, etc. that simplify moving. A similar variety of non-powered devices also exist for people to choose from. Non-powered devices, such as pulleys, ropes, clamps, levers and hand trucks, are commonly available to consumers. The ease of use of contemporary hand trucks makes the hand truck an ideal tool for transporting heavy objects and has led to the common use of hand trucks by tremendous numbers of people.

The wide utilization of hand trucks has caused many manufacturers to research improvements in the design of the modern hand truck. Today, industrial quality hand trucks are produced that have frames made of sturdier, tougher materials to simplify transporting appliances and other items that are too large for smaller sized hand trucks. These industrial quality hand trucks are useful for transporting exceedingly larger items, and are often even capable of handling appliances or equipment that are much greater in size than the user who is navigating the hand truck.

One drawback of current hand trucks is the lack of features and capabilities to help users manage large, heavy loads and provide adequate safety precautions. Basic features, such as straps, are commonly used to hold the load in place on the hand truck and prevent it from moving or falling off the truck. However, exceptionally heavy loads often require additional safety features to prevent injury to the user. For example, the common procedure for using hand trucks is to tip the truck to a given angle, such as 45 degrees, to balance the primary weight of the load on the wheels. However, when tipping the truck, exceptionally heavy loads may be hard to manage and may pull the truck away from the user, risking both injury to the user and damage to the load.

Additionally, some trucks include safety features that can be deployed by the user to assist in handling and navigating the truck when handling large loads. However, often times, users are required to take at least one hand off of the primary handling location of the hand truck in order to activate or deploy such safety or load assist features. Removing one or both hands from the hand truck may be dangerous and maybe defeat the purpose of the safety feature altogether if the load or truck becomes unstable.

Accordingly, an improved hand truck is needed in the art.

SUMMARY

A hand truck is generally presented. The hand truck includes a frame, a toe plate connected to the frame, a pair of wheels rotatably secured to the frame, and a handle connected to the frame. A fourth-wheel attachment is pivotally connected to the frame at a first point and removable connected to the frame at a second point. A lever is positioned adjacent to the handle. Activation of the lever causes the removable connection between the fourth-wheel attachment and the frame to be released, allowing the fourth-wheel assembly to pivot away from the frame.

In an embodiment, the fourth wheel assembly includes a latch connected to the frame. The latch is configured to interconnect with a latch bar positioned on the fourth-wheel attachment. The handle is connected to a first end of a cable or connecting device. The cable or connecting device is connected at a second end to the latch. Activating the lever may pull the cable or connecting device upward and apply a force on the spring to release the latch.

The cable or connecting device may be connected at a third end to the fourth-wheel attachment. Activating the lever may pull the cable or connecting device upward and apply a force to the fourth-wheel attachment to move the fourth-wheel attachment from a deployed position toward an upright position.

In an embodiment, a hand truck includes a frame, a toe plate connected to the frame, a pair of wheels rotatably connected to the frame, and a break back bar pivotably connected to the frame. The break back bar may be biased toward the upright position.

The break back bar may be pivoted to a down position to contact the ground. A weight applied to the break back bar when in a down position may prevent the hand truck from rolling.

The break back bar may be biased by a spring. The spring may be positioned on an axis positioned between portions of the frame. The axis may also be connected to the wheels to allow them to rotate with respect to the frame.

In an embodiment, a hand truck includes a frame, a toe plate connected to the frame, a pair of wheels rotatably connected to the frame, a handle connected to the frame, and a break back bar pivotably connected to the frame. The hand truck further includes a fourth-wheel attachment pivotally connected to the frame at a first point and removable connected to the frame at a second point and an activation lever adjacent to the handle. Activation of the lever causes the removable connection between the fourth-wheel attachment and the frame to be released, allowing the fourth-wheel assembly to pivot away from the frame.

BRIEF DESCRIPTION OF THE DRAWINGS

The operation of the invention may be better understood by reference to the detailed description taken in connection with the following illustrations, wherein.

DETAILED DESCRIPTION

Figure 1:
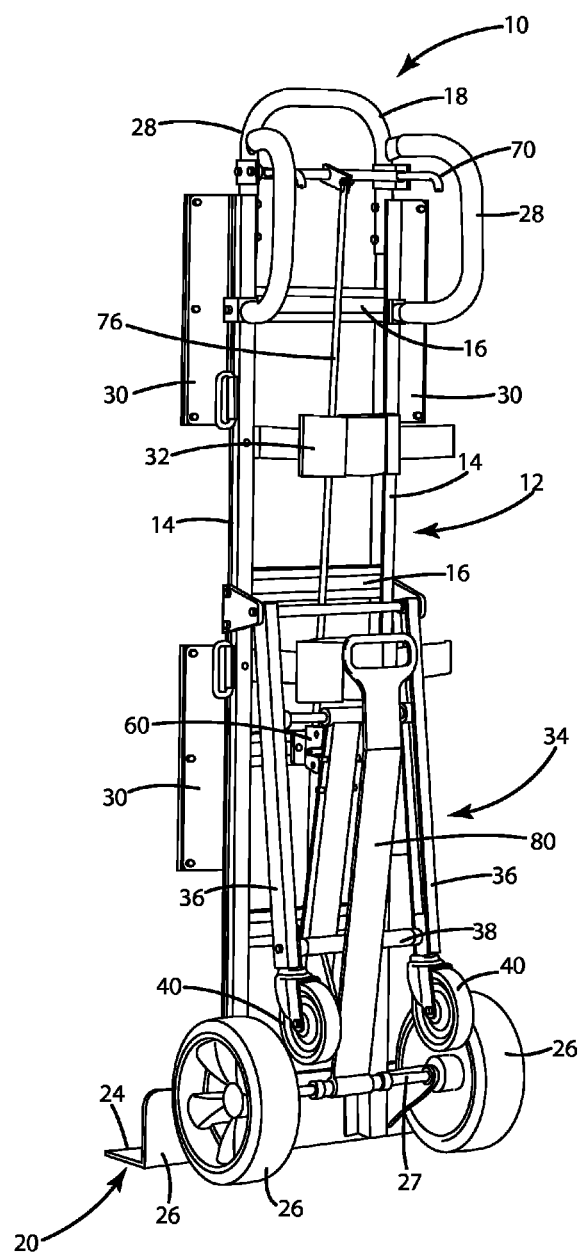
FIG. 1 illustrates a perspective view of a hand truck in upright position.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A hand truck 10 is generally presented, as illustrated in FIGS. 1-16. The hand truck 10 may be configured to receive and move a load, such as an appliance or other large objects. The hand truck 10 may include various new features as described below, including features that assist a user in managing excessively large loads and prevent the hand truck from tipping or slipping away from the user while in use.

The hand truck 10 may include a frame 12. The frame may comprise a pair of vertical supports 14 and a plurality of horizontal cross supports 16. The vertical supports may extend from the base of the hand truck 10 to the near top of the hand truck and may be connected at the top by a connecting bar 18, such as the u-shaped connected bar 18 illustrated in FIG. 1. The horizontal cross supports 16 may connect to and span the vertical supports 14. The cross supports 16 may be evenly spaced along the height of the frame 12. The hand truck 10 may include any appropriate number of cross supports 16.

The frame 12 may be made of any appropriate material, such as a high strength, lightweight material, such as aluminum or extruded aluminum. However, it will be appreciated that the frame 12 may be made of any appropriate material, such as steel, stainless steel, or high-density plastic, or the like.

The hand truck 10 may include a toe plate 20. The toe plate may be located at the base of the frame 12 and may be connected thereto. The toe plate 20 may be any appropriate shape, such as having a 90 degree bend to form two portions, as shown in FIGS. 1-5. The first portion 22 may extend vertically from the base of the frame 12 and connect to the frame. The second portion 24 may extend horizontally away from the fame 12 and close to the ground when the hand truck 10 is in use. The toe plate 20 may be configured to receive a load thereon and hold the load in place during transportation and balancing of the hand truck 10. The toe plate 20 may be made of any appropriate material, such as steel, aluminum, or the like.

The hand truck 10 may include wheels 26. The wheels 26 may be any appropriate size and may be positioned near and connected to the base of the frame 12. The wheels 26 may be connected to an axle 27 to allow them to rotate with respect to the frame 12. The axle 27 may be spaced a distance away from the frame 12 by a bracket or other connecting feature, to provide space for the wheels to rotate. The wheels 26 may allow a load on the toe plate 20 to be pivoted and transported.

The hand truck 10 may include one or more handles 28. The handles 28 may be connected to a portion of the frame 12, such as an upper portion of the frame 12. The handles 28 may protrude from the frame 12 in an opposite direction as the toe plate 20. The handles 28 may comprise a curved portion, such as illustrated in FIGS. 1-5. The handles may be covered with padding or other grip friendly material to assist with handling.

The hand truck 10 may include various features to assist in maintaining the load positioning on the hand truck 10. For example, the hand truck 10 may include one or more wing plates 30. The wing plates 30 may be connected to the vertical supports 14 and may extend beyond the perimeter of the frame 12 to provide support for wide loads. The wing plates 30 may be any appropriate shape, such as generally rectangular, and may be made of any appropriate material, such as steel, aluminum, or the like.

The hand truck 10 may further include on or more strap assemblies 32. The strap assemblies may be mounted to the rear side of the frame 12, opposite the toe plate 20, as illustrated in FIGS. 1-5. The strap assemblies 32 may include a base and a strap for securing a load to the frame 12. The strap may wind around the base for storage and may be unwound and connected to itself or another strap or to the frame to fix the load in place. As shown, the straps may comprise retractable straps, such as retractable straps contained within enclosures. Alternatively, the straps may include loose or manually adjustable straps, such as e-track straps, that may be manually positioned and adjusted by a user to the desired length and position.

Figure 6:
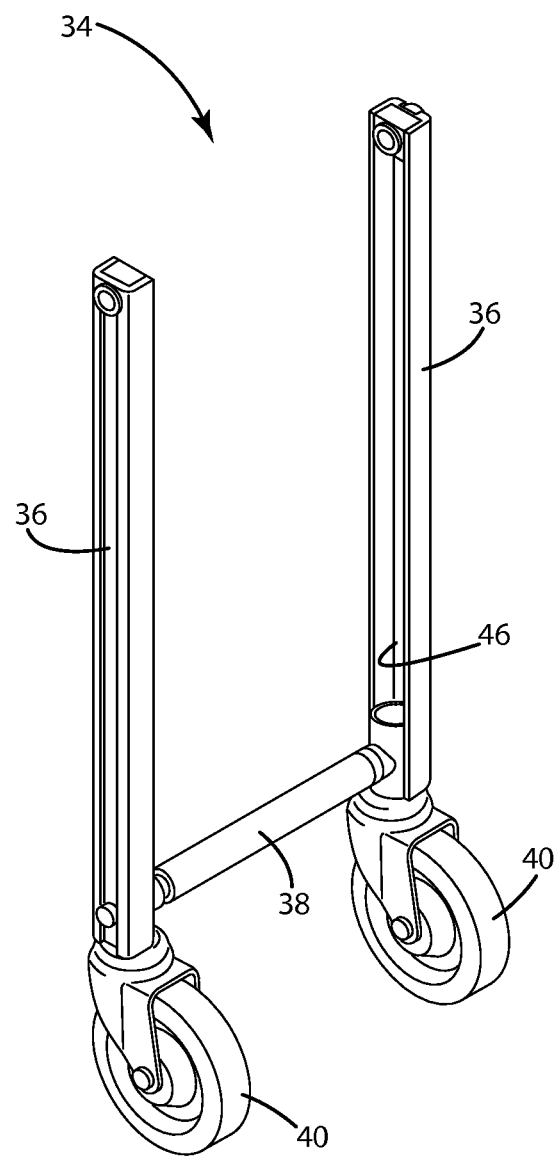
FIG. 6 illustrates a perspective view of a fourth-wheel attachment.

In an embodiment, the hand truck 10 may include a fourth-wheel attachment 34. The fourth-wheel attachment, as illustrated in FIG. 6, may comprise a pair of side supports 36 connected by a support bar 38. A wheel 40, such as a caster wheel as illustrated in FIG. 6, may be connected to a bottom end of each side support.

Figure 4:
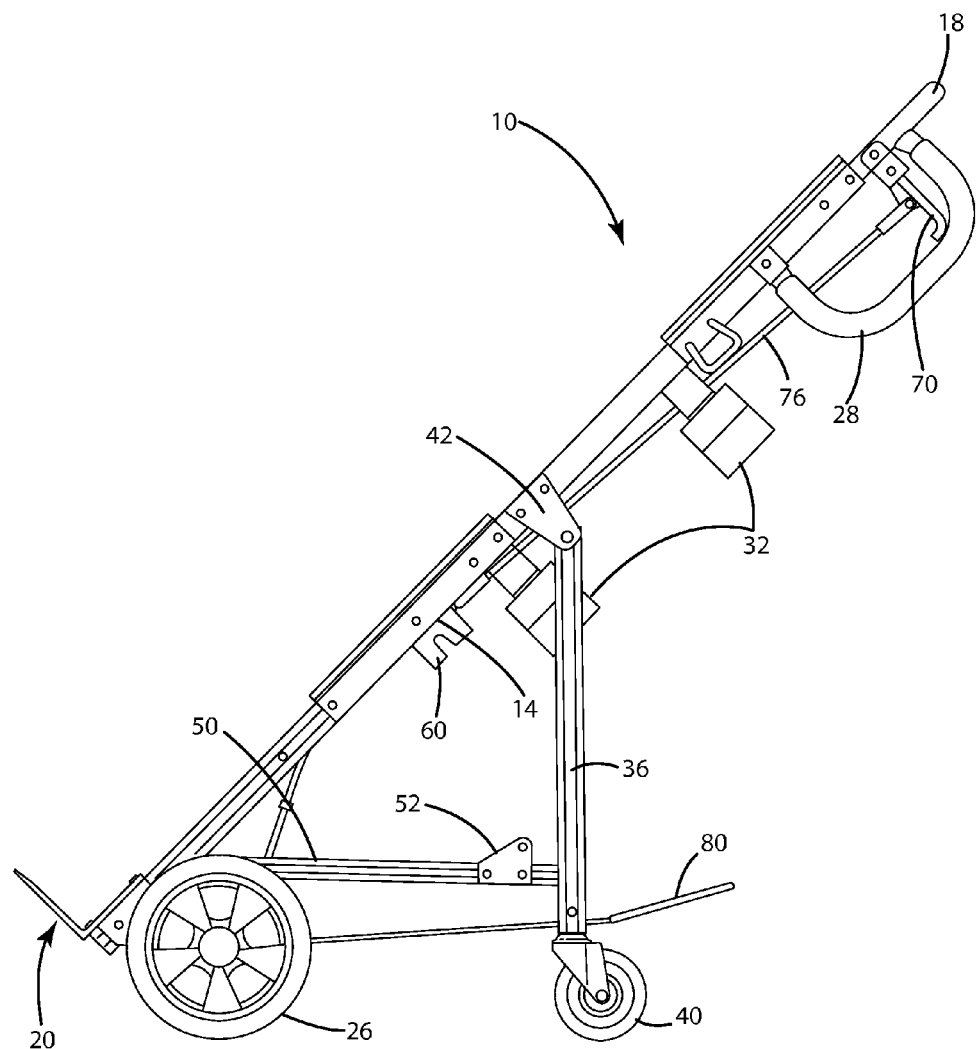
FIG. 4 illustrates a side view of a hand truck in reclined position.

The fourth-wheel attachment 34 may be connected to the frame 12 and capable of pivoting with respect to the frame 12. For example, as illustrated in FIG. 4, a bracket 42 may be connected to each of the vertical supports 14. The side supports 36 may be pivotally connected to the brackets 42 to allow the fourth-wheel attachment 34 to pivot with respect to the frame 12.

The fourth-wheel attachment 34 may include a sliding axle 44. The sliding axle 44 may be connected to the side supports 36 and configured to move or slide with respect to the supports 36. For example, the side supports 36 may each include an inner channel or opening 46, as shown in the detailed view in FIG. 9. A bearing 48 may be positioned within each channel 46 and capable of sliding within the channel 46. The bearing 48 may be a plastic self-lubricating bearing 48, or any appropriate bearing 48. The upper and lower boundaries of the channels 46 may be closed to prevent the bearings 48 from escaping out of the channel. The sliding axle 44 may connect to the bearings 48 at each end of the axle 44 to allow the sliding axle 44 to slide with respect to the fourth-wheel attachment 34.

Figure 7:
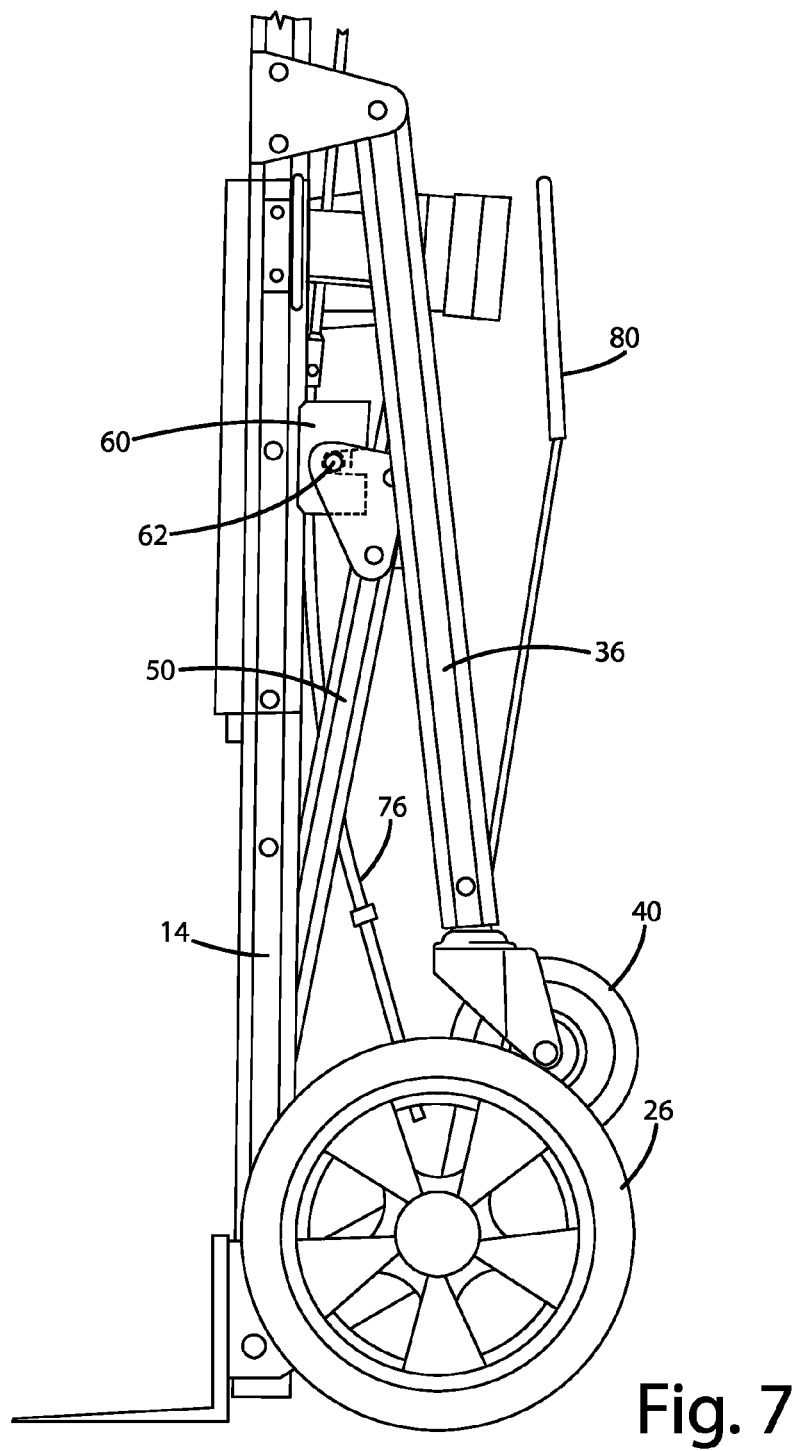
FIG. 7 illustrates a detailed side view of a fourth-wheel attachment connected to a hand truck in upright position.
Figure 8:
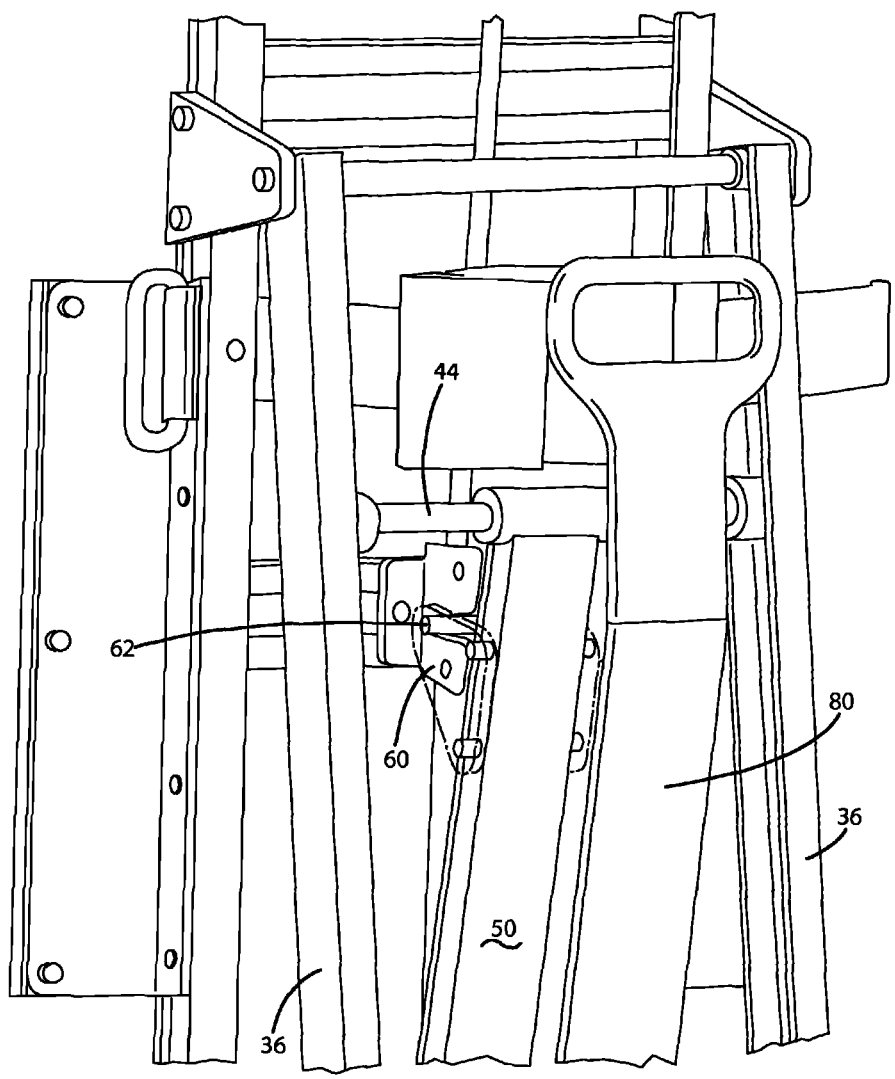
FIG. 8 illustrates a perspective view of a fourth-wheel attachment connected to a hand truck in upright position.
Figure 9:
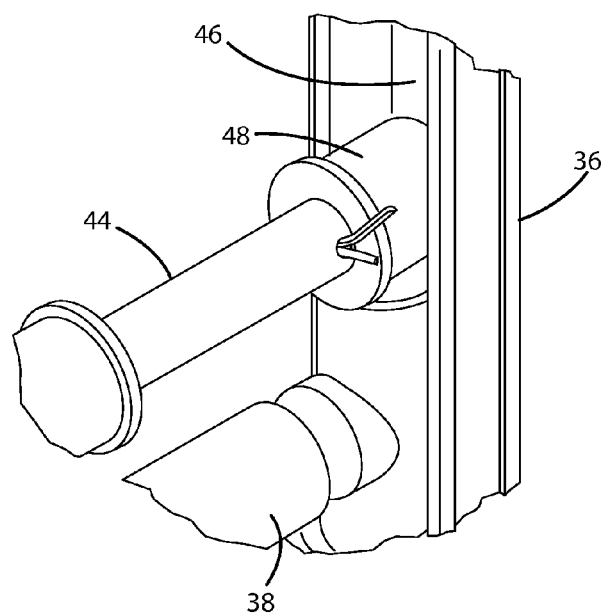
FIG. 9 illustrates a detailed view of a roller axle assembly for a fourth-wheel attachment.

As best seen in FIGS. 4 and 7, a brace 50 may interconnect the sliding axle 44 and the frame 12. The brace 50 may comprise a bar, such as a portion of aluminum extrude. The brace 50 may connect at a first end to the sliding axle 44. For example, the first end of the brace 50 may be connected to a first collar 52. The first collar 52 may connect to the sliding axle 44 and be rotatable with respect to the sliding axle 44. The second end of the brace 50 may be connected to a second collar 53. The second collar 53 may be connected to a pivot axis 54. The pivot axis 54 may be connected between the vertical supports 14 near the base of the frame 12. The second collar 53 may be rotatable with respect to the pivot axis 54.

In an embodiment, illustrated in FIGS. 17-20, the engagement between the brace 50 and fourth-wheel attachment 34 may include a pair of pivot sockets 56. The pivot sockets 56 may comprise a hollow body with open ends. The pivot sockets 56 may be positioned around the side supports 36 and slide with respect thereto. An axle 58 may extend between the two pivot sockets 56. Instead of the bearing 48 positioned within the channel 46, as shown in FIGS. 1-16, the pivot sockets 56 may slide up and down the length of the side supports. The first collar 52 may connect to the axle 58 and pivot or rotate with respect to the axle 58.

Figure 10A:
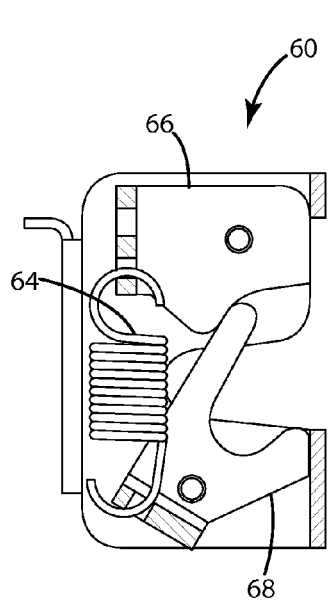
FIG. 10a illustrates a side view of a latch assembly.
Figure 10B:
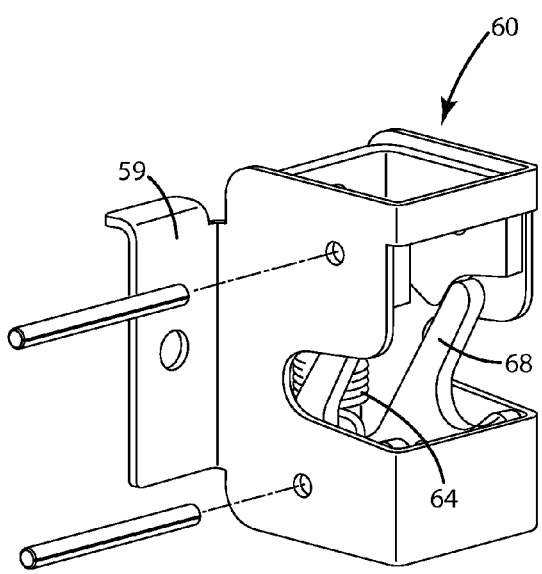
FIG. 10b illustrates a perspective assembly view of a latch assembly.

A latch 60, positioned on the frame 12, may be configured to receive and hold the fourth-wheel attachment 34 in a first position, as further described below. The latch 60 may be connected to any appropriate portion of the frame 12, such as a cross support 16. The latch may include a mounting bracket 59 to mount and connect the latch 60 to the frame 12. The latch may further include a spring 64, locking cam 66, and pivot cam 68. The spring 64 may be interconnect and apply a biasing force to the locking cam 66 and pivot cam 68. The locking cam 66 and pivot cam 68 may be biased to an open position, as shown in FIG. 10 *a*, when nothing is held within the latch 60. In open position, the latch 60 may be capable of receiving a bar therein, expanding the spring 64, and locking the bar between the locking cam 66 and pivot cam 68. The bar may be removed from the latch 60 by expanding the spring 64 to relieve the locking force and removing the bar from the latch 60.

The brace 50 may include a latch bar 62 to lock the brace 50 and fourth-wheel attachment 34 to the latch 60. The latch bar 62 may be spaced a distance away from the brace 50 to provide room for the bar to latch within the latch mechanism described above.

Figure 2:
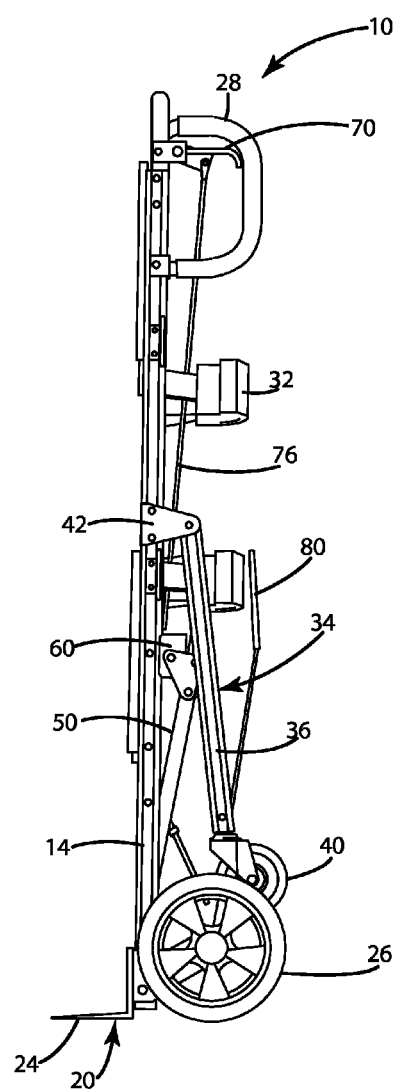
FIG. 2 illustrates a side view of the hand truck in upright position.
Figure 3:
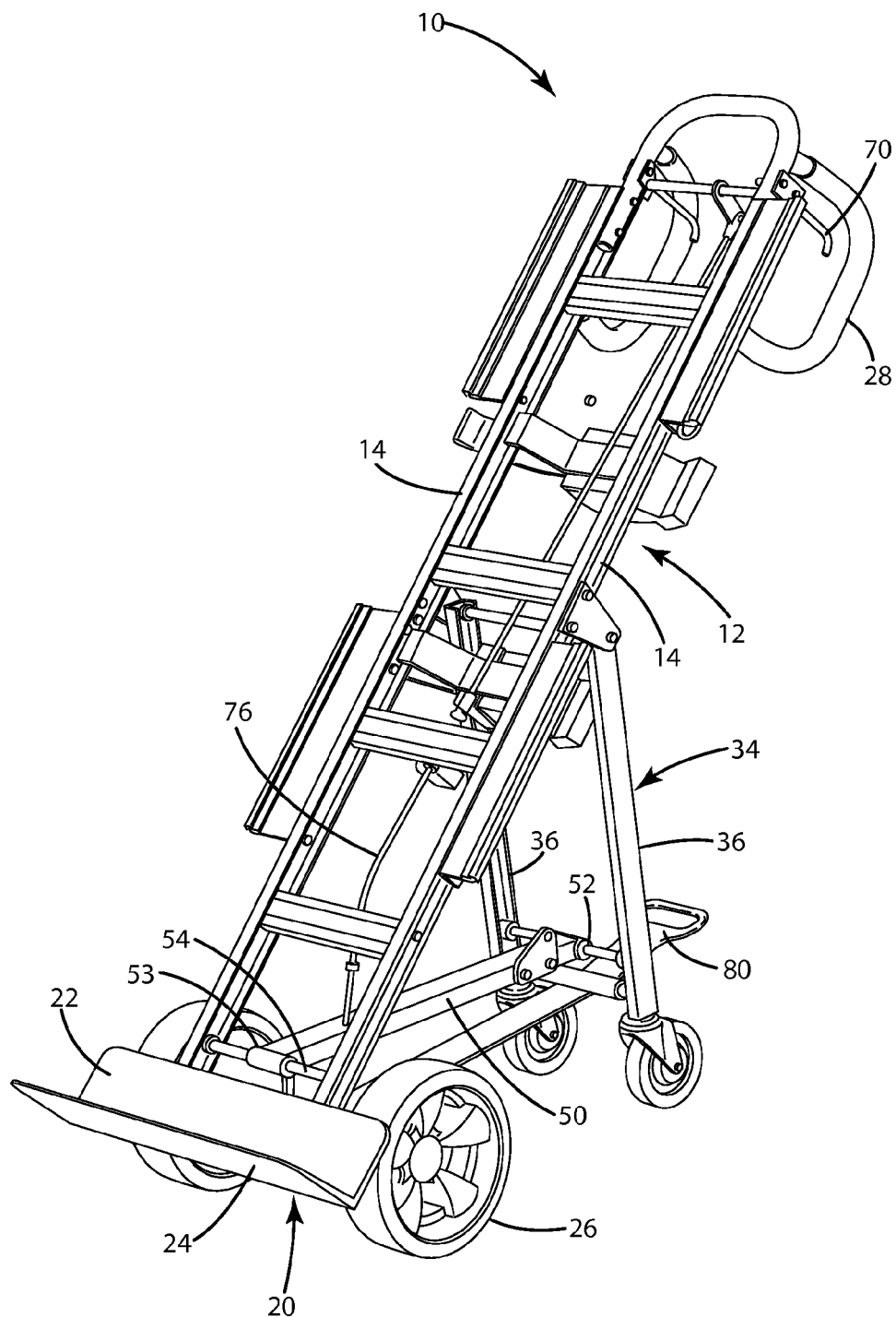
FIG. 3 illustrates a front perspective view of a hand truck in reclined position.
Figure 5:
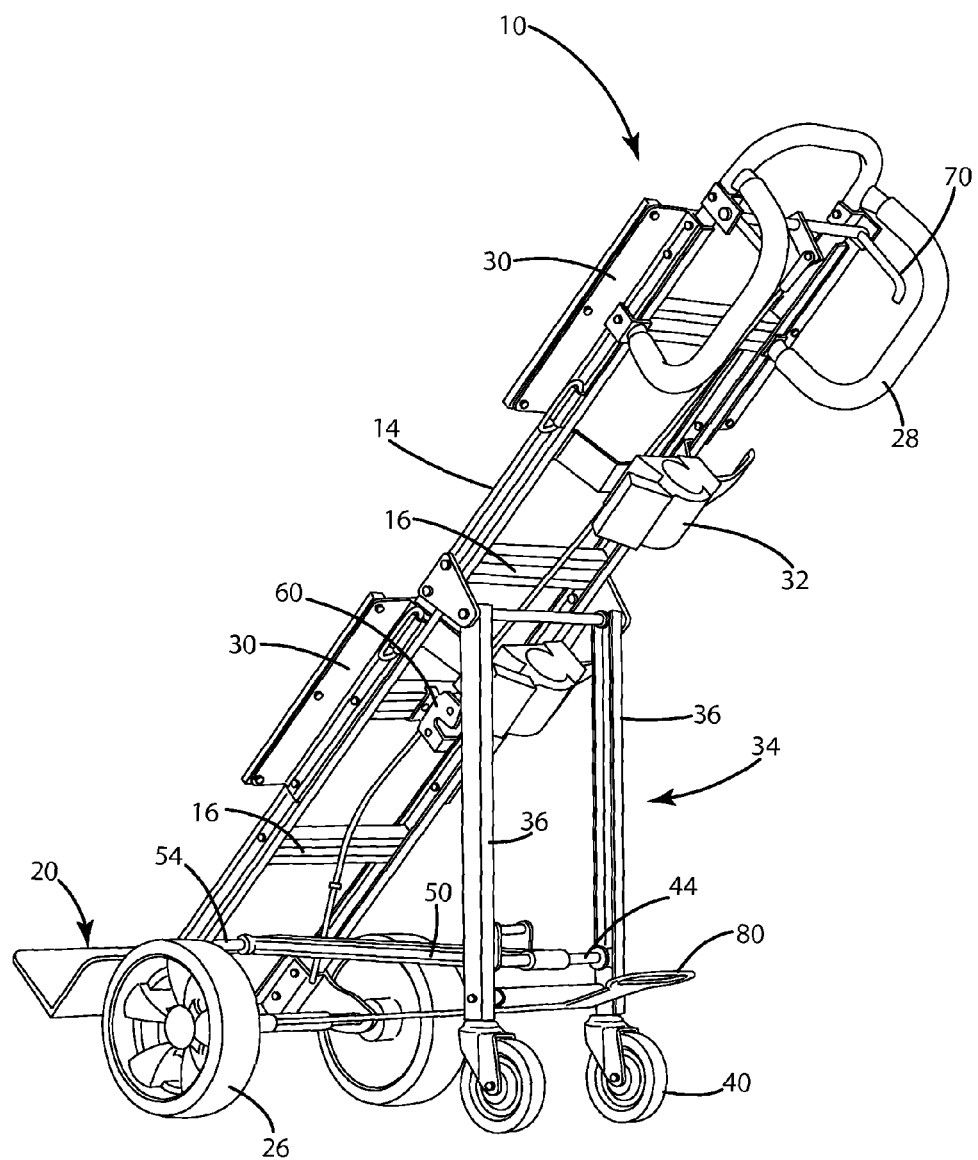
FIG. 5 illustrates a rear perspective view of a hand truck in reclined position.

The hand truck 10 may be movable between upright and reclined positions. In upright position, as shown in FIGS. 1 and 2, the latch bar 62 may be held within the latch 60 to lock the fourth-wheel attachment 34 into general alignment with the frame 12. In reclined position, as shown in FIGS. 3-5, the fourth-wheel attachment 34 may be removed from the latch 60 and the sliding axle 44 may slide to the distal end of the channel 46. The side supports 36 may be positioned approximately perpendicular to the ground and the frame 12 may pivot to an angle of approximately 45 degrees with respect to the ground in reclined position.

Figure 11:
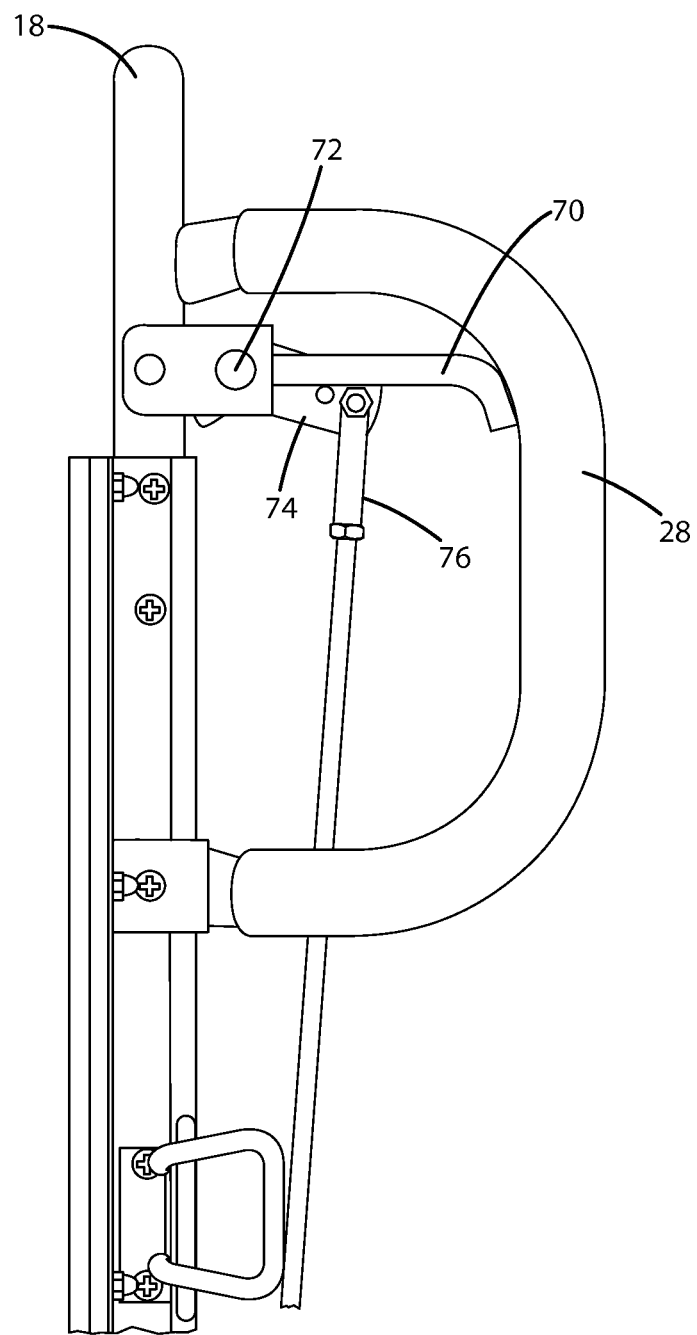
FIG. 11 illustrates a detailed side view of a handle assembly.
Figure 12:
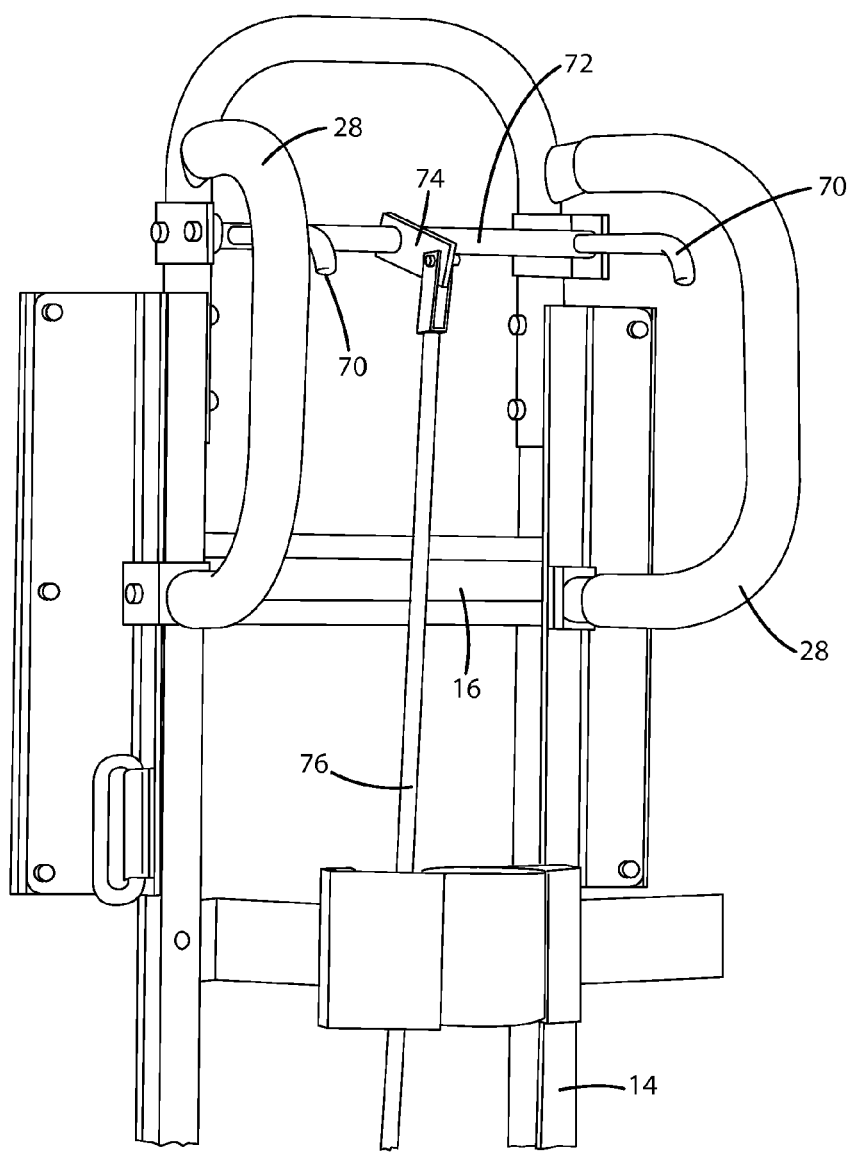
FIG. 12 illustrates a detailed perspective view of a handle assembly.

The hand truck 10 may include a fourth-wheel attachment release mechanism to provide ease of use for activating and stowing the fourth-wheel attachment 34. One or more activation handles 70 may be positioned near the handles 28 of the hand truck 10. As shown in FIGS. 11 and 12, the hand truck 10 may include two activation handles 70, one on each side near the upper portion of the frame 12. The one or more activation handles 70 may be positioned in near proximity to the hand truck handles 28, such as 2 inches, 4 inches, or 6 inches from the handles 28. It will be appreciated that the proximity of the activation handle or handles 70 to the hand truck handles 28 may be important in allowing a user to activate the fourth-wheel attachment 34 without removing their hands from the hand truck handles 28. Accordingly, the one or more activation handles 70 may be positioned within finger's reach from the truck handles 28, such as between the handles 28, to allow a user to both hold the handles 28 and grasp the activation handle 70 simultaneously.

The one or more activation handles 70 may be connected to a rod 72. The rod may extend from the base of the activation handles 70 and span laterally between the vertical supports 14. In an embodiment having two or more handles 70, the rod 72 may interconnect the handles 70 such that pulling on any of the handles 70 will rotate the rod 72. A bracket 74 may extend from a portion of the rod 72, such as a central portion of the rod 72. The bracket 74 may be tied to a cable 76 that extends down from the bracket 74. It will be appreciated that the hand truck 10 is not limited to using a cable 76, and may instead use any similar or workable device, such as a chain, connecting rod, or the like. Pulling up on the activation handles 70 will apply an upward force on the cable 76, and releasing the activation handle will allow the cable 76 to return to its original position.

Figure 13:
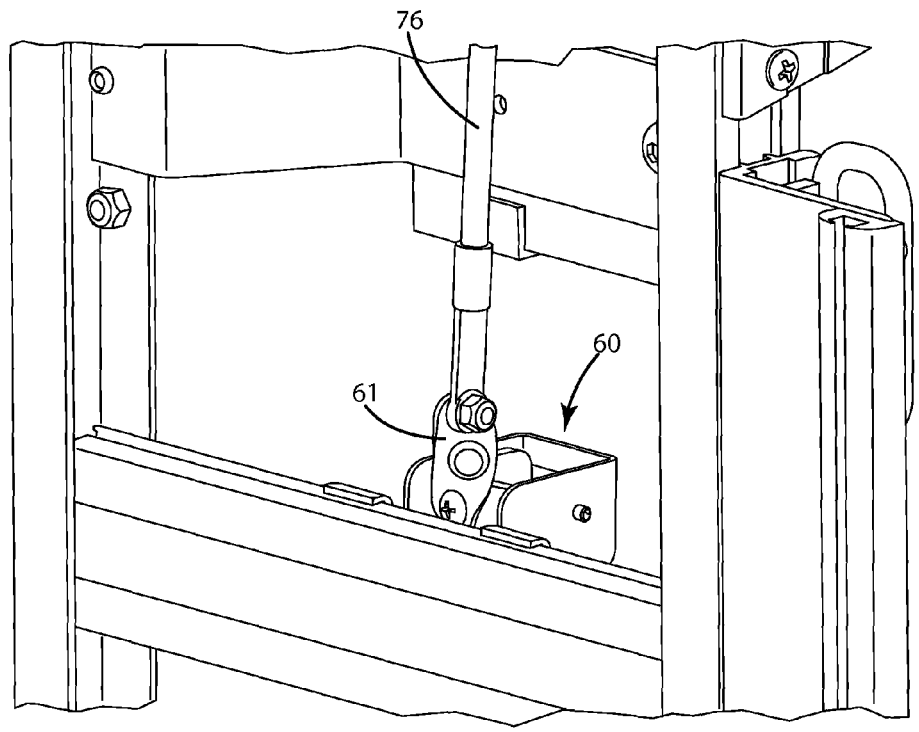
FIG. 13 illustrates a front perspective view of a latch assembly connected to a cable.

The cable or connecting device 76 may extend down and connect to the latch 60, as shown in FIG. 13. A twist link 61 may be connected to the end of the cable 76 and connected to the spring 64. The twist link 61 may comprise a bracket having a quarter or 90 degree turn. The 90 degree turn or twist may allow the twist link 61 to connect to a side of the cable 76 and be properly oriented to connect to the spring 64. When the activation handle 70 is pulled up and activated, it will pull the cable upward and apply a force on the spring 64. The force may decompress the spring 64 and pivot the locking cam 66 and pivot cam 68 to release the latch 60 and allow the latch bar 62 to exit the latch 60.

A lower end of the cable 76 may extend past the latch 60 and continue further down and connect to the brace 50. When the fourth-wheel attachment 34 is stowed in upright position, the lower end of the cable 76 may have slack. When the fourth-wheel attachment 34 is employed in the reclined position, the slack in the lower end of the cable 76 may be drawn tight. In the reclined position, when the activation handle 70 is activated the lower cable 76 will apply any upward force on the brace 50, pulling on the fourth-wheel attachment 34 to make it pivot back up into stowed, upright position.

In use, the hand truck 10 may be configured in stowed, upright position with the fourth-wheel attachment 34 connected to the latch 60 by the latch bar 62. To adjust the hand truck 10 into reclined position and deploy the fourth-wheel attachment 34, one or more activation handles 70 may be activated. Pulling the activation handle 70 will apply an upward force on the cable 76, which in turn will expand the spring 64 and open the latch 60. When the hand truck 10 is pivoted about its wheels 26 while the activation handle 70 is activated, the gravitational force may pull the latch bar 62 out of the latch 60 and the fourth-wheel attachment 34 may deploy. The bearings 48 may slide within the channels 46 to a distal end of the channels 46 and the brace 50 may pivot out away from the frame, extending the fourth-wheel attachment 34. Alternatively, in the embodiment illustrated in FIGS. 17-20, the pivot sockets 58 may slide along the side supports 36 toward the wheels 40, extending the fourth-wheel attachment 34. The hand truck 10 may then be rested on the fourth-wheel attachment wheels 40 and the hand truck wheels 26 to fully support and transport the load in reclined position.

To stow the hand truck 10 back into upright position, the truck 10 may be partially pivoted on the wheels 26 back towards upright position. The activation handle 70 may then be actuated, which will apply an upward force on the brace 50, pivoting the brace 50 and fourth-wheel attachment 34 back toward the frame 12. The latch bar 62 may engage the latch 60 and lock therein, and the hand truck 10 may be moved back to upright position with the fourth-wheel attachment 34 stowed.

Figure 14:
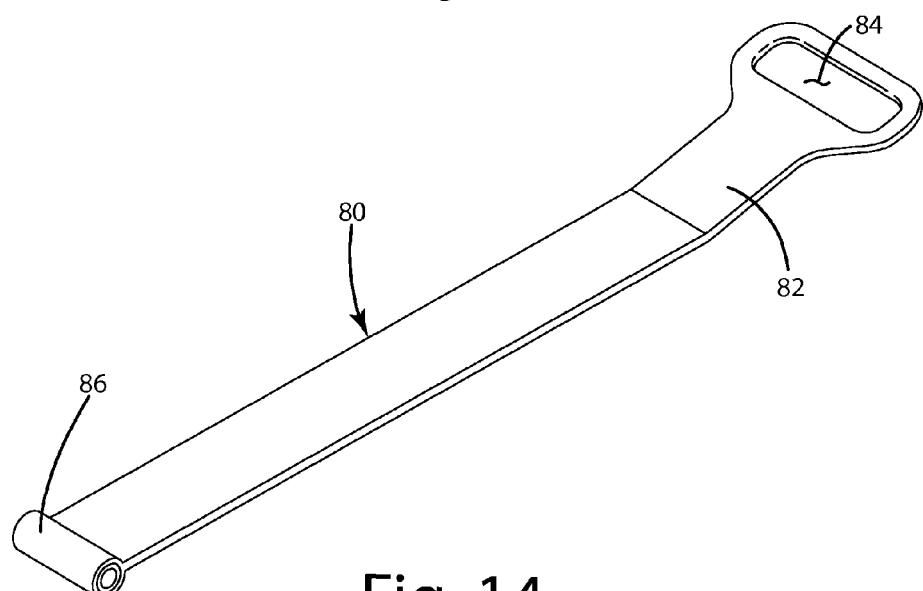
FIG. 14 illustrates a perspective view of a break back bar.
Figure 15:
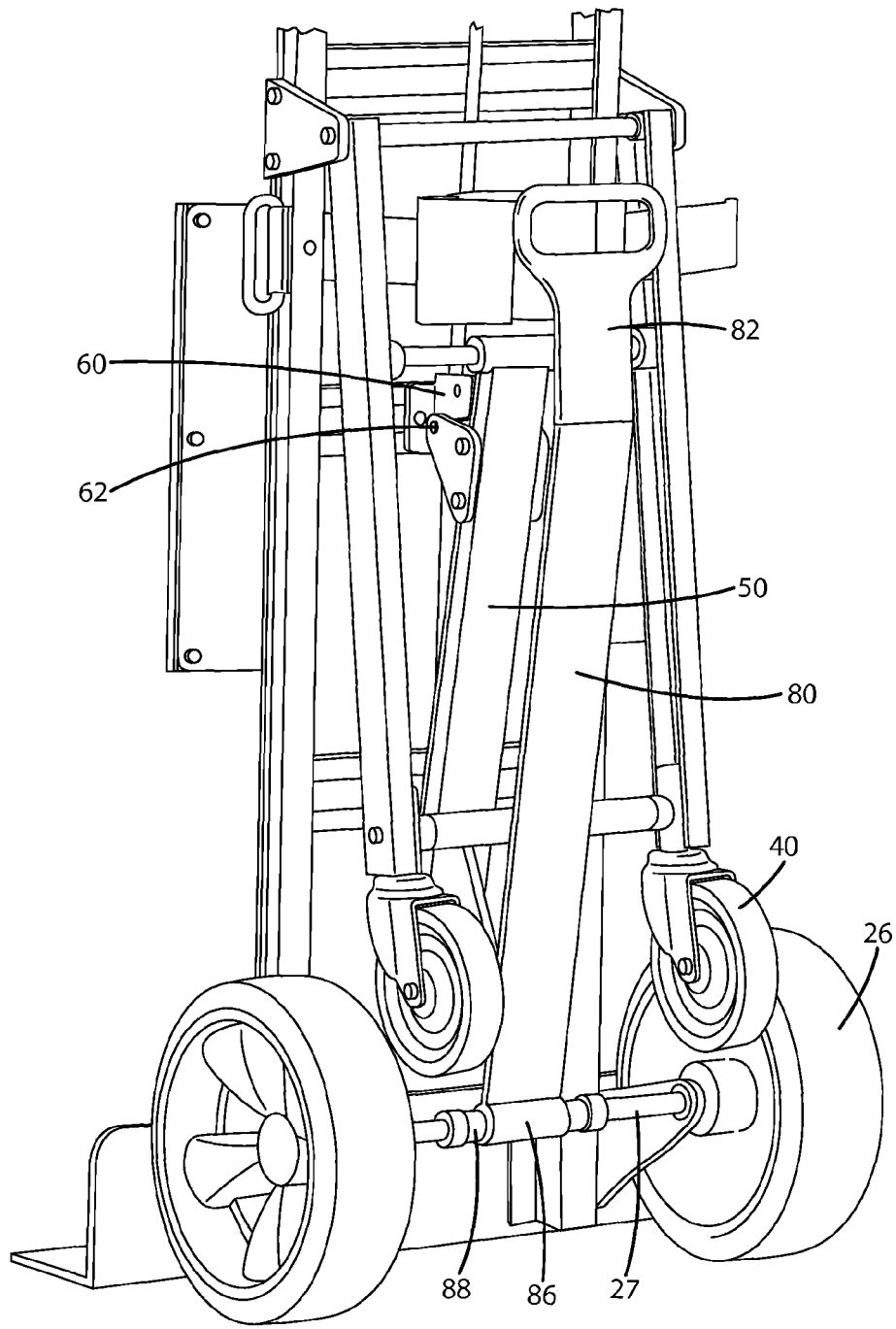
FIG. 15 illustrates a break back bar in upright position.
Figure 16:
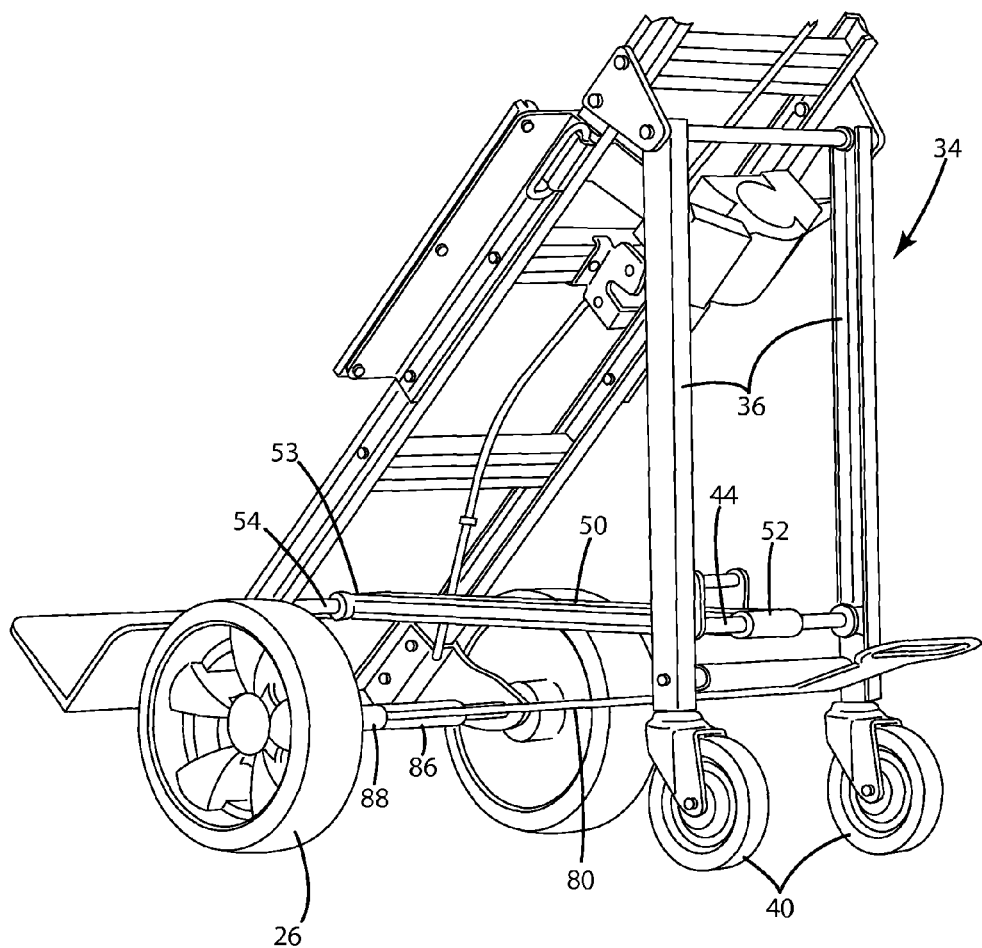
FIG. 16 illustrates a break back bar in activated position.
Figure 17:
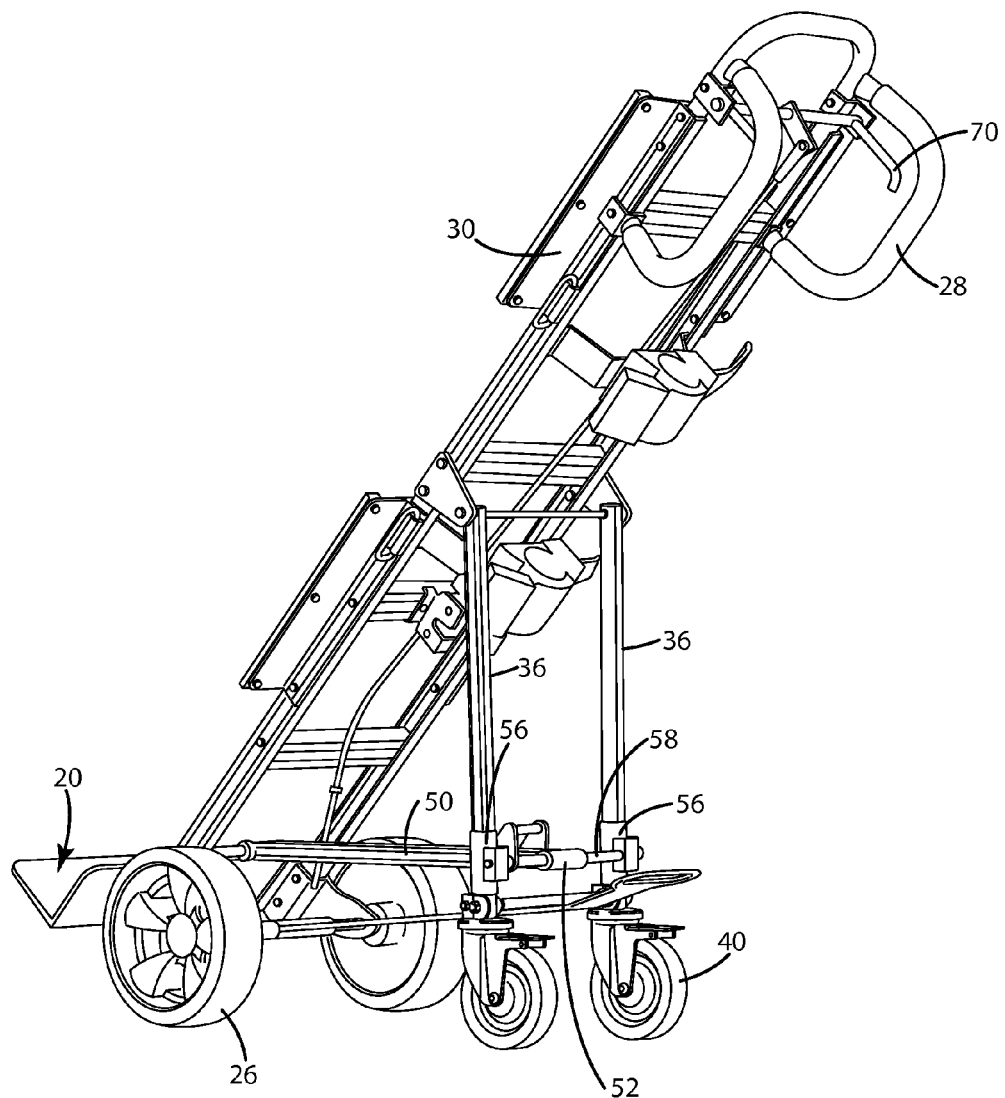
FIG. 17 illustrates a rear perspective view of a hand truck having pivot sockets on the fourth-wheel assembly.
Figure 18:
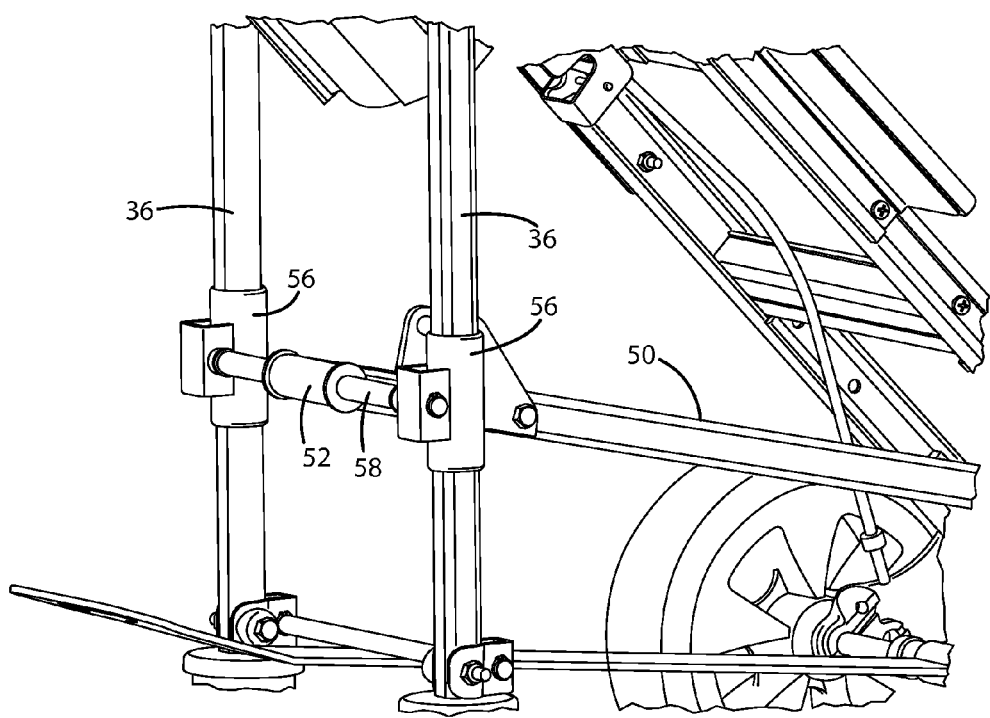
FIG. 18 illustrates a fourth-wheel assembly with pivot sockets in reclined position.
Figure 19:
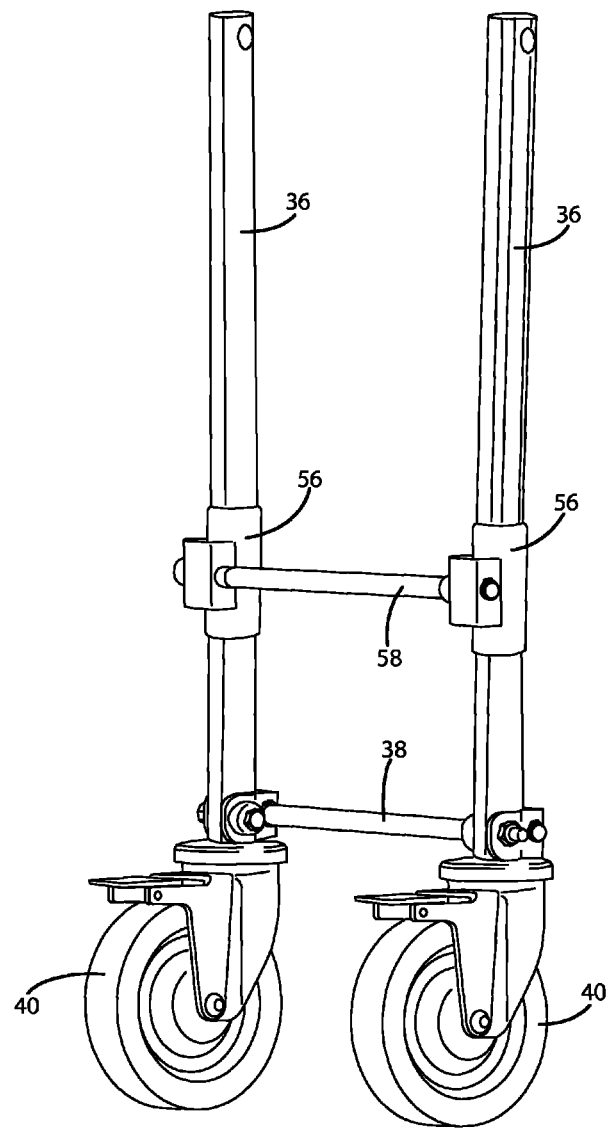
FIG. 19 illustrates a fourth-wheel assembly with pivot sockets.
Figure 20:
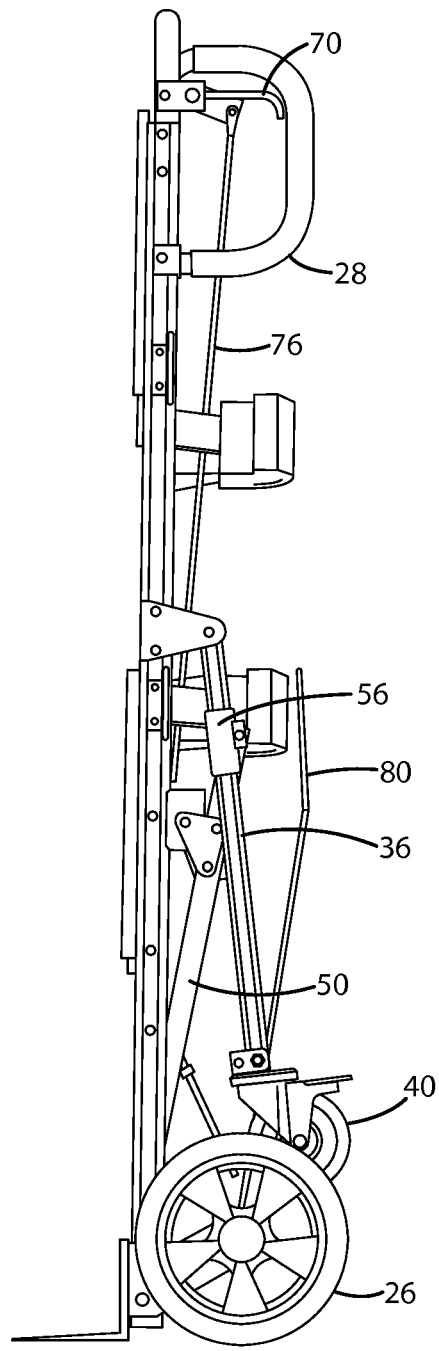
FIG. 20 illustrates a fourth-wheel assembly with pivot sockets in upright position.

In an embodiment, the hand truck 10 may include a break back bar 80, as illustrated in FIGS. 14-16. The break back bar 80 may be useful in helping to stabilize the hand truck 10 when pivoting back towards the reclined position to prevent the load from running away from the user.

The break back bar 80 may be any appropriate shape and size, such as generally thin and rectangular shaped. The break back bar 80 may have an angled end 82 positioned at a slight angle to the remainder of the break back bar 80. The angled end 82 may include a small opening or handle hole 84.

The break back bar 80 may be connected to the wheel axle 27, as illustrated in FIGS. 15 and 16. A collar 86 may be positioned about the axle 27 and rotatable with respect to the axle 27. The break back bar 80 may be connected to the collar 86 and capable of pivoting with respect to the axle 27 and frame 12 between an up position generally adjacent to the frame 12 and shown in FIG. 15, and a down position generally parallel to the ground and shown in FIG. 16.

The break back bar 80 may be biased toward the upright position. For example, the axle 27 may include one or more springs 88 configured to bias the collar 86 to pivot upward toward the frame 12. The spring 88 may be positioned on and wound about the axle 27 and connected to the collar 86 at one end, as illustrated in FIG. 15. It will be appreciated, however, that any type of spring or biasing device may be used to bias the break back bar 80 toward the upright position.

In use, the break back bar 80 may be biased toward the upright position while the hand truck 10 is also in upright position. A user may pivot the break back bar down toward the ground by applying a force with their hand or foot, and may then step onto the break back bar 80 to apply their entire weight, or a portion thereof, to the bar 80. The hand truck 10 may then be pivoted to a reclined position without risk of rolling away from the user. Once the hand truck 10 is in a secure, balanced position, the user may remove their foot from the bar 80 and it will return to its upright position. The break back bar 80 may again be used to assist in returning a reclined load to upright position. The user may once again pivot and deploy the break back bar 80 using their hand or foot and step on the bar, pinning the bar to the ground. The load may then be pivoted back to upright position without risk of losing control. Using the break back bar 80 may reduce the strain and potential injury to a user by allowing them to maintain an upright posture while pivoting the load, instead of any awkward bending.

It will be appreciated that the hand truck 10, as described herein, may include a break back bar 80 but not a fourth-wheel attachment 34, or alternatively, may include a fourth-wheel attachment 34 but not a break back bar 80. Each feature may operate separately from the other and provide the benefits as described herein.

In an embodiment, as illustrated in the FIGS. 1-16, the hand truck 10 may include both a fourth-wheel attachment 34 and a break back bar 80. The two features may work in concert to assist a user in stabilizing and controlling the hand truck 10. In use, the hand truck 10 may be stowed in the upright position with the fourth-wheel-attachment 34 positioned adjacent to the frame 12, and the break back bar 80 biased toward the frame 12 behind the fourth-wheel attachment 34, as shown in FIG. 15. To deploy the fourth-wheel attachment 34, a user may first pivot and step on the break back bar 80, as described above. The activation handles 70 may then be actuated to release the fourth-wheel attachment 34 and move the truck 10 into reclined position, as shown in FIG. 16. To revert back to upright position, the truck may be tilted towards upright position and the activation handle 70 may again be actuated to pull the fourth-wheel attachment 34 up and latch it into stowed position. The break back bar 80, which is biased as described above, will then pivot back up into upright position.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A hand truck comprising:
   a frame;
   a toe plate connected to said frame;
   a pair of wheels rotatably connected to said frame;
   a fourth-wheel attachment pivotably connected to said frame at a first point and removably connected to said frame at a second point, said fourth-wheel attachment including one or more wheels, said fourth-wheel attachment is pivotably connected to said frame at a support frame,
   a support bar connected to the support frame;
   a brace pivotally connected to said frame at a first end and pivotally connected to said support bar at a second end;
   a latch connected to said frame, a latch bar connected to said brace, wherein said latch bar connects to said latch, wherein said latch comprises a biasing member that biases the latch;
   a handle connected to said frame; and
   a lever connected to said frame and positioned adjacent to said handle; and
   wherein said lever releases said fourth-wheel attachment from connection with said frame, wherein said lever is connected to said biasing member via the latch, the lever connected to the latch by a cable.

2. The hand truck of claim 1, wherein said support bar is slidable with respect to said side supports.

3. The hand truck of claim 2 further comprising a bearing located at each end of said support bar, wherein said bearings slide within channels in said side supports.

4. The hand truck of claim 1, wherein said biasing member is a spring.

5. The hand truck of claim 1, wherein said cable is further connected to said brace.

6. The hand truck of claim 1 further comprising a second lever interconnected to said first lever by a connecting rod.

7. The hand truck of claim 6, wherein said first and second levers are positioned between said handle and a second handle connected to said frame.

8. The hand truck of claim 6 further comprising a bracket connected to said rod, wherein said bracket is further connected to said connecting device.

9. The hand truck of claim 1 further comprising a break back bar pivotally connected to said frame.

\* \* \* \* \*